United States Patent
Wheeler

[15] 3,677,139
[45] July 18, 1972

[54] LINE REPLACEABLE UNIT CONTROL VALVE

[72] Inventor: Mildred S. Wheeler, Long Beach, Calif.
[73] Assignee: McDonnell Douglas Corporation
[22] Filed: July 13, 1970
[21] Appl. No.: 54,197

[52] U.S. Cl. .................................91/384, 91/367, 137/315, 251/366
[51] Int. Cl. ............................................F15b 9/10
[58] Field of Search ..............91/384, 367; 251/366; 137/315

[56] References Cited

UNITED STATES PATENTS

| | | | |
|---|---|---|---|
| 2,301,176 | 11/1942 | Elliott | 251/366 |
| 3,348,804 | 10/1967 | Piccardo | 137/315 |
| 2,409,842 | 10/1946 | Eaton | 91/384 |
| 2,766,732 | 10/1956 | Schultz | 91/384 |
| 2,988,881 | 6/1961 | Reggio | 91/384 |

*Primary Examiner*—Paul E. Maslousky
*Attorney*—Walter J. Jason, Donald L. Royer and George W. Finch

[57] ABSTRACT

A control valve for a hydraulic actuator assembly is constructed in a manner holding certain dimensions therein within predetermined limits so that the valves are interchangeable without recalibration. In addition, the valves are constructed to be easily removed from a hydraulic actuator assembly with a straight line motion which does not adversely effect the calibration of the control valve and of the actuator assembly.

4 Claims, 4 Drawing Figures

INVENTOR.
MILDRED S. WHEELER
BY George W Finch
- Attorney -

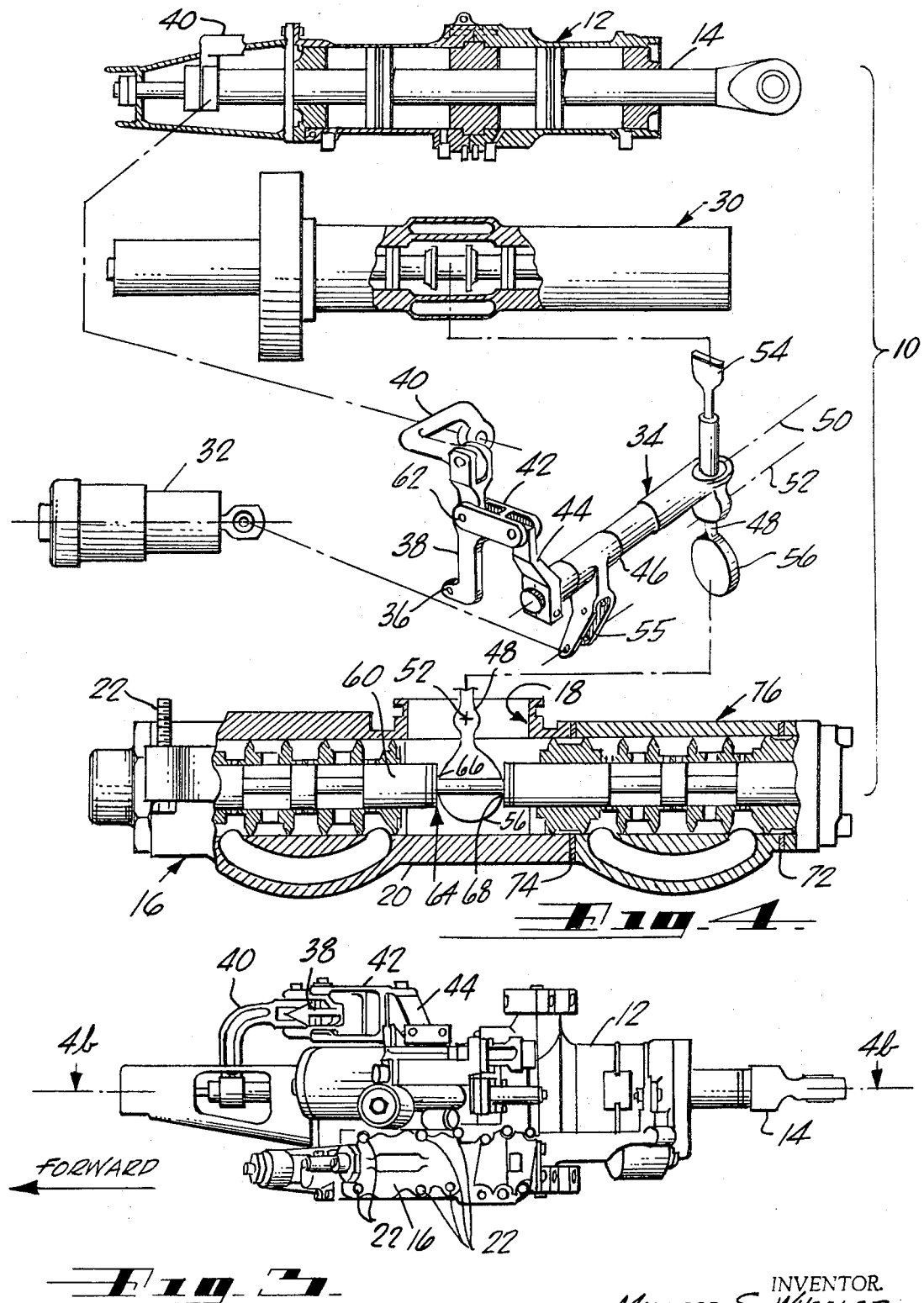

LINE REPLACEABLE UNIT CONTROL VALVE

BACKGROUND OF THE INVENTION

Modern day aircraft are now of such size and/or fly at such airspeeds that power boosts through the use of hydraulic actuator assemblies on the control surfaces as well as other portions thereof are required. The hydraulic actuator assemblies employed in aircraft while normally being reliable and efficient, have certain operative portions thereof which, due to various problems, have relatively low life expectancies in comparison to the hydraulic actuator assemblies overall. An example of such portions are the control valves thereof which have replacement rates of from 3 to 5 times the replacement rate of the manifold or cylinder assemblies to which they are attached. This is true for all types of control valves from those controlled manually having a simple, single input up to redundant types requiring complex electrical and mechanical multiple inputs with summing linkages. None of these heretofore known control valves have been designed specifically to be replaceable or removable from the manifold or cylinder assemblies to which they are attached while installed in the aircraft and therefore, failures of such control valves have necessitated removal of entire hydraulic actuator assemblies. On most aircraft in use today, the removal of the entire hydraulic actuator assembly is difficult and time consuming. In addition, some of the current generation of aircraft require hydraulic actuator assemblies which are so large in size and weight that the removal thereof present extreme maintenance problems requiring the aid of external hoists and in most cases, the removal of several stressed access doors in the aircraft skin.

It is therefore desirable to construct control valves which are line replaceable units (LRU). Conversion of the heretofore available control valves into LRU type control valves has been found impossible. For example, the single input control valves now in use require the removal of a valve crank or difficult lateral movement combined with pulling motion to disengage the valve drive arm. In addition, many control valves require the removal of the housing for the valve and valve spool separately while control valves with complex summing linkages such as are used in conjunction with autopilots, require the opening of side plates in the manifolds thereof to disengage the summing linkage. Most control valves also require the removal of a large diameter, threaded retaining ring requiring application of high torque in a restricted area within the aircraft. All of these procedures mentioned above can and usually do, destroy the sensitive null or zero flow calibration between the control valve and the rest of the hydraulic actuator assembly and in addition, expose the assembly and most particularly the control valve to environmental contamination and the loss of expensive hydraulic fluid. When the null calibration is destroyed, the entire assembly must be removed from the aircraft and recalibrated on a hydraulic flow stand, a very expensive and time consuming operation. When contamination is introduced into the assembly, the reliability and the life expectancy, not only of the assembly but of the entire hydraulic system, is adversely effected.

SUMMARY OF THE INVENTION

The present invention overcomes these and other disadvantages and shortcomings of the previously known control valves by providing a line replaceable unit (LRU) control valve which due to novel construction including the holding of certain predetermined tolerances therein, can be easily removed and replaced from an associated hydraulic actuator assembly without destroying the null calibration thereof and can also be interchanged with other control valves, because such valves can be precisely null calibrated separately from the rest of the hydraulic assembly. The predetermined tolerances involved include holding the position of a plurality of attachment points or bolt holes which are placed at specified locations in the control valve housing with respect to linkage abutment surfaces within the valve which are calibrated to control the operation thereof. Generally by holding the tolerances between these portions of the control valves, constructed according to the present invention, the valves can be made interchangeable and replaceable in hydraulic actuator assemblies without recalibration thereof.

Therefore, a principle object of the present invention is to provide a control valve with interchangeability without recalibration by controlling the tolerances thereof through the use of locating diameters or pins so that the valves can be removed, replaced and spared as separate LRUs from the actuator or manifold assemblies.

Another object is to provide an LRU control valve which permits the removal of the valve from the actuator or manifold it controls in a straight line movement by merely removing attachment bolts.

Another object is to provide an LRU control valve where the chances of the control spool therein binding are minimized.

Another object is to provide an LRU control valve which is relatively immune to contamination since the valve parts requiring close lapped fits on assembly are entirely contained within the removable housing portion thereof and are thus protected from contamination. The entry of contaminates is therefore confined to interfacing surfaces of the valve housing itself.

Another object is to provide an LRU control actuator which in design concept can be used with single system control valves, single system dual concentric control valves, dual system tandum control valves, and dual system tandem concentric control valves.

Another object is to provide a tandem LRU control valve which meets FAA regulations which state "no single failure shall cause the loss of two hydraulic systems."

These and other objects and advantages of the present invention will become apparent after considering the following detailed specification which covers various embodiments thereof in conjunction with the accompanying drawings wherein:

BRIEF DESCRIPTION OF THE DRAWINGS

FIG. 3 is a view of the hydraulic actuator assembly of FIG. 1 from the underside thereof with the LRU control valve of FIG. 2 installed thereon.

FIG. 4 is an exploded view of the hydraulic actuator assembly of FIGS. 1 and 3 including the LRU control valve in cross-section taken along line 4a—4a of FIG. 2, the hydraulic actuator in cross-section taken along line 4b—4b of FIG. 3, a servo actuator, a servo lockout and interconnecting linkage therebetween. The portions of the assembly are not necessarily to scale.

DESCRIPTION OF THE PRESENT EMBODIMENT

Figure 1:
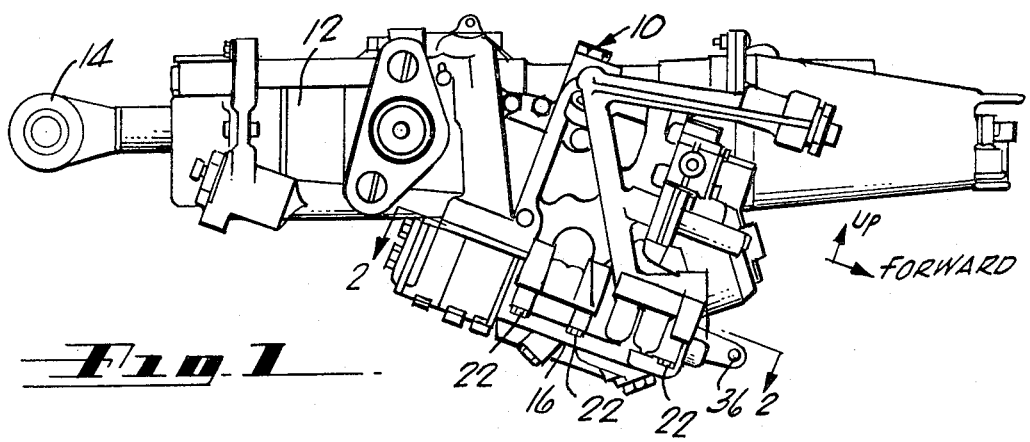
FIG. 1 is a side view of a tandem electro-hydromechanical servo actuator assembly with its normal orentation shown by arrows.

Referring to the drawings more particularly by reference numbers, number 10 in FIG. 1 refers to a hydraulic actuator assembly for use as a control surface actuator on an aircraft. The arrows labeled UP and FORWARD adjacent thereto show the normal orientation of the actuator assembly 10 when installed on an aircraft. The theory of operation of such assemblies is explained in U.S. Pat. application Ser. No. 47,741, filed concurrently herewith by Robert E. Schenbeck entitled Multi-channel Autopilot with Equalization Means which is assigned to applicant's assignee.

Figure 2:
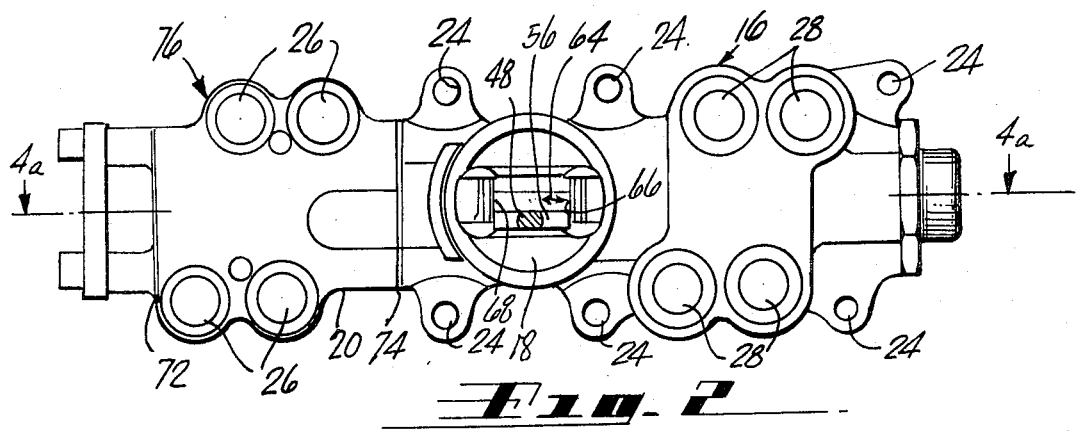
FIG. 2 is an enlarged top view of a tandem LRU control valve looking down into the linkage entrance port thereof and includinG a portion of the linkage positioned therein shown in cross-section taken along line 2—2 of FIG. 1.

The assembly 10 includes a hydraulic actuator 12 whose output arm 14 provides the connection to the aircraft control surface (not shown) to move it. Also included in the assembly 10 is an LRU main control valve 16 constructed according to the present invention. The control valve 16 is shown in FIG. 2 which is a top view thereof, looking down into the linkage entrance port 18 in the valve housing 20.

The control valve 16 is connected to the remainder of the actuator assembly 10 by close tolerance bolts 22 which pass through bolt holes 24 in the housing 20 thereof. Also shown in FIG. 2 are the hydraulic manifolds 26 and 28 of the valve 16. The valve 16 shown is a tandem valve which relatively independently controls the hydraulic flow to either two actuators or a dual actuator such as actuator 12 of FIG. 1. The manifolds 26 conduct the hydraulic flow to one portion of the actuator 12 and the manifolds 28 conduct the hydraulic flow to the other. The manifolds 26 and 28 and the linkage port 18 face in an upwardly direction so that when the valve 16 is removed from the rest of the assembly, the hydraulic fluid remains within the valve 16 to protect it from contamination as much as possible. This arrangement also reduces spillage of hydraulic fluid to a minimum.

Referring to FIG. 4 to get a better view of the assembly 10 in FIGS. 1 and 3, FIG. 4 is an exploded view of the assembly 10 showing the more important portions thereof including the hydraulic actuator 12, the LRU control valve 16, an autopilot servo 30, a lockout device 32 and linkage means 34 to mechanically interconnect the various components of the assembly. Input commands are fed into such an assembly 10 either through electrical inputs to the servo 30 or by means of manual mechanical inputs at pivot point 36 on link 38 which forms a part of the linkage means 34. The link 38 connects the output arm 14 of the hydraulic actuator 12, connected thereto by an arm 40, to the main control valve 16 by means of another link 42, a crank 44, a shaft 46, and a summing link 48. The axis of rotation 50 of the shaft 46 as shown, is above the pivotal axis 52 at which point the summing link 48 is pivotally connected to the shaft 46.

Although the hydraulic actuator 12, the servo 30, the lockout device 32, and the assorted linkage are specific to one particular hydraulic actuator assembly 10, various types of linkage and actuators can be used with LRU control valves embodying the present invention.

In normal autopilot operation of the assembly 10, an electrical input command is fed to the servo 30 which then moves the position of the control valve 16 from its null flow condition to the position producing the desired flow condition. The servo 30 does this by moving the upper end 54 of the summing link 48 which rotates about pivotal axis 52 because the lockout device 32 prohibits the shaft 46 to which it is connected by arm 55 from rotating. This causes the lower end 56 of the summing link 48 which extends down into the control valve 16 through the linkage port 18 to move the spool 60 of the control valve 16. This causes the aforesaid flow of hydraulic fluid to the hydraulic actuator 12 which moves the output arm 14 thereof and the connected control surface in the desired direction. As the output arm 14 moves, arm 40 feeds the mechanical motion thereof back through the link 38 which rotates about the pivot 62 connecting link 38 to link 42 to thereby reposition the manual control system (not shown) connected to pivot point 36 in correspondence to the new position of the control surface.

When manual inputs are used to control the assembly 10, the lockout 32 is disengaged so that the shaft 46 can rotate about the axis 50. At the same time the servo 30 is fixed in a centered position. Manual inputs at point 36 therefore cause rotation of the shaft 46 about the axis 50 to reposition the axis 52. Since the upper end 54 of the summing link 48 is relatively fixed by the centered servo 30, the lower end 56 of the summing link 48 is moved in proportion to the movement of the axis 52 to move the spool 60 of the control valve 16. The control valve then allows the flow of hydraulic fluid to the actuator 12 to move the output arm 14 thereof and the connected control surface. The motion of the output arm 14 is fed back through the arm 40, the link 42, the crank 44 and the shaft 46 to reposition the summing link 48 and the lower end 56 thereof so that the spool 60 of the control valve 16 is recentered and the flow of hydraulic fluid is reduced to zero thereby ceasing motion of the output arm 14 and the control surface in the position commanded.

It should be apparent from the above discussion that it is critical that the control valve 16 be returned to a null or zero flow condition when no further travel of the output arm 14 is desired. The zero or null point of such a control valve 16 must be very small or the resolution and/or repeatability will be poor. In addition, since many functions on modern aircraft depend upon the accuracy of such a control system, the null point must also be very accurately calibrated. Heretofore, main control valves such as those which perform the function of LRU control valve 16 have required a complete recalibration upon installation in the hydraulic assembly 10. This has been due, in part, to the inability to hold tolerances due to the specific designs thereof and because the previous assembly designs have not been constructed with ease of installation and removal of the main control valve from the rest of the assembly in mind.

Looking more specifically at the control valve 16 as shown in FIGS. 2 and 4, the valve is mounted to the hydraulic assembly 10 by the close tolerance bolts 22 with the valve spool 60 at a right angle to a direction of attachment. The valve spool 60 as shown includes a full diameter groove 64 defined by parallel abutment surfaces 66 and 68. The surfaces 66 and 68 are lapped to a very close tolerance both in distance apart and in parallelism. The lower end 56 of the summing link 48 is also lapped to a very close diameter tolerance to closely fit within the two abutment surfaces 66 and 68. Since the tolerances are held between the abutment surfaces 66 and 68 and the lower end 56 of the summing link 48, valves 16 and summing links 48 are interchangeable without being matched. When the valve spool 60 is trimmed to null during manufacture, the location of the groove 64 is held in relationship to the close tolerance bolt holes 24 which are the reference points used to interface the control valve 16 with the rest of the assembly. When the rest of the assembly 10 is calibrated, with the shaft 46 fixed by the lockout device 32, the location of the summing link 48, and therefore axes 50 and 52 are held to bolt holes in the assembly (not shown) for the bolts 22 which retain the control valve 16 in proper position. The control valve 16 when installed is indexed to these holes by its bolt holes 24 and the close tolerance bolts 22. All of this null calibration of the hydraulic actuator assembly takes place with relationship of the summing link 48 to the bolt holes. The control valve 16 is therefore interchangeable with other control valves without recalibration.

The control valve 16 is removable from the rest of hydraulic assembly by the removal of the close tolerance bolts 22. When the control valve 16 is freed by removal of the bolts 22, it can be removed by a straight downwardly pull parallel to the direction of bolt attachment so that the lower end 56 of the summing link 48 slides vertically out from between the two abutment surfaces 66 and 68 of the groove 64 in the control valve spool 60. A new control valve is installed by reversing the procedure. The control valve 16 can be pulled vertically down from the rest of the assembly 10, as it is normally sits, and therefore the hydraulic fluid in the control valve 16 remains therein and the inner workings thereof are only subject to contamination from outside sources at the openings, of the manifolds 26 and 28 and the linkage entrance port 18.

It should be apparent that although in the tandem valve 16 shown in FIG. 2, a single summing link 48 is included, the valve 16 is adaptable to dual summing linkages. By looking at FIG. 2, it can be seen that the valve 16 is adaptable to have the lower end 56 of two summing links 48 inserted within the groove 64 on both sides of the spool rather than on the one side as shown. These types of dual valve linkages are useful when a dual redundance is required so that if one summing link breaks, the assembly 10 is still operable. In regards to these redundancies, the control valve 16 is constructed employing "rip stop" means so that if a portion of the housing 20 fails by cracking, the crack can not "grow" into other portions of the housing 20. These "rip stop" means are shown in FIG. 2 and 4 as sections 72 and 74 of the housing 20 which sections are constructed of material such as brass through which cracks do not propagate. The valve 16 as shown can also be easily converted from a tandem valve to a single control valve. This can be done by removing the portion 76 of the valve 16 including the enclosed portion of the spool 60 between the "rip stop" means 72 and 74. It should be noted that all of the locating bolt holes 24 of the described embodiment will remain after the removal of portion 76 during conversion.

Thus there has been shown and described a novel LRU control valve which fulfills all the objects and advantages sought therefor including being able to be line replaceable on a hydraulic assembly without recalibration thereof. Many changes, alterations, modifications, other uses and applications of the subject LRU control valve will become apparent to those skilled in the art after considering this specification and the accompanying drawings. All such changes, alterations and modifications which do not depart from the spirit and scope of the invention are deemed to be covered by the invention which is limited only by the claims which follow.

I claim:

1. A replaceable valve for controlling the flow of fluid to accurately control the positioning of a hydraulic actuator having linkage means to feed input commands to the valve at predetermined times, said valve including:
   a valve housing, including means for removably connecting said valve housing to the actuator in accurate position with respect to a predetermined position of the linkage means thereof, said housing also including at least two portions which are bonded together by a brazed connection which precludes cracks in one portion thereof from propagating to the other portion thereof; and
   a valve spool within said housing whose position with respect to said housing is related to the control that said valve exerts over the flow of fluid, said valve spool having a groove therein for engagement with the linkage means, said groove being accurately positioned at a predetermined location in said valve spool with respect to a position of the valve spool within said housing which causes cessation of the flow of fluid to the actuator to maintain the actuator in the position commanded by the input command; said valve having a predetermined normal orientation with respect to gravity, said connecting means for said valve housing allowing straight downward removal of said valve housing from the actuator in the normal orientation, said valve housing further including:
   a linkage port through which the linkage means extend; and
   hydraulic fluid manifolds which connect to the actuator to provide passageways for the fluid whose flow to the actuator is controlled by said valve; said port and manifolds defining openings in the valve housing which in the normal orientation thereof face upwardly so that the fluid therein is retained therein by gravity when said valve is removed from the actuator to thereby prevent excessive waste of fluid and to protect said valve spool within said housing from contamination.

2. A replaceable valve for controlling the flow of fluid to control a hydraulic actuator having linkage means to feed input commands to the valve at predetermined times, said valve having a predetermined normal orientation with respect to gravity and including:
   a valve housing, including means for removably connecting said valve housing to the actuator in accurate position with respect to a predetermined position of the linkage means thereof, wherein said connecting means allow straight downward removal of said valve housing from the actuator in the normal orientation, a linkage port through which linkage means extend, and hydraulic fluid manifolds which connect to the actuator to provide passageways for the fluid whose flow to the actuator is controlled by said valve; and
   a valve spool within said housing whose position with respect to said housing is related to the control that said valve exerts over the flow of fluid, said valve spool having a longitudinal axis there-along and a groove therein for engagement with the linkage means, said groove being accurately positioned at a predetermined location in said valve spool with respect to a position of the valve spool within said housing which causes cessation of the flow of fluid to the actuator, said groove being defined by two parallel abutment walls, perpendicular to said longitudinal axis, said abutment walls being in abutment with the linkage means, said means for connecting said valve housing to said actuator connecting in a direction parallel to said parallel abutment walls so that upon removal of said valve housing from the actuator said valve housing can be removed in a direction parallel to said abutment walls no matter what the position of said spool within said housing, and said port and manifolds defining openings in the valve housing which in the normal orientation thereof face upwardly so that the fluid therein is retained therein by gravity when said valve is removed from the actuator to thereby prevent excessive waste of fluid and to protect said valve spool within said housing from contamination.

3. The replaceable valve defined in claim 2 wherein said means for removably connecting said valve housing to the actuator include:
   bolt holes formed in said valve housing in accurate predetermined positions with respect to said groove when said valve spool is at the position which causes cessation of the flow of fluid to the actuator; and
   close tolerance bolts which extend through said bolt holes to removably connect said valve housing to the actuator.

4. A replaceable valve for controlling the flow of fluid to accurately control the positioning of a hydraulic actuator having linkage means to feed input commands to the valve at predetermined times, said valve including:
   a valve housing, including means for removably connecting said valve housing to the actuator in accurate position with respect to a predetermined position of the linkage means thereof; and
   a valve spool within said housing whose position with respect to said housing is related to the control that said valve exerts over the flow of fluid, said valve spool having a groove therein for engagement with the linkage means, said groove being accurately positioned at a predetermined location in said valve spool with respect to a position of the valve spool within said housing which causes cessation of the flow of fluid to the actuator to maintain the actuator in the position commanded by the input command, said valve spool also having a longitudinal axis therealong and wherein said groove is defined by two parallel abutment walls, perpendicular to said longitudinal axis, said abutment walls being in abutment with the linkage means and said means for connecting said valve housing to said actuator connecting in a direction parallel to said parallel abutment walls so that upon removal of said valve housing from the actuator said valve housing can be removed in a direction parallel to said abutment walls no matter that the position of said spool within said housing, said valve also having a predetermined normal orientation with respect to gravity, said connecting means for said valve housing allowing straight downward removal of said valve housing from the actuator in the normal orientation, said valve housing further including:
   a linkage port through which the linkage means extend; and
   hydraulic fluid manifolds which connect to the actuator to provide passageways for the fluid whose flow to the actuator is controlled by said valve; said port and manifolds defining openings in the valve housing which in the normal orientation thereof face upwardly so that the fluid therein is retained therein by gravity when said valve is removed from the actuator to thereby prevent excessive waste of fluid and to protect said valve spool within said housing from contamination.

* * * * *